United States Patent
Nakawaki

(10) Patent No.: US 7,933,051 B2
(45) Date of Patent: Apr. 26, 2011

(54) PROGRAM STARTUP APPARATUS, CONTROL METHOD THEREOF, AND MEDIUM STORING PROGRAM

(75) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 11/857,359

(22) Filed: Sep. 18, 2007

(65) Prior Publication Data

US 2008/0074713 A1 Mar. 27, 2008

(30) Foreign Application Priority Data

Sep. 22, 2006 (JP) ................................ 2006-257890

(51) Int. Cl.
*H04N 1/04* (2006.01)
(52) U.S. Cl. ........ 358/474; 358/403; 358/1.15; 709/203
(58) Field of Classification Search .................. 358/474, 358/403, 1.15, 407, 448, 404, 442, 451, 468; 709/203
See application file for complete search history.

(56) References Cited

U.S. PATENT DOCUMENTS

| | | | | | |
|---|---|---|---|---|---|
| 4,549,804 | A | * | 10/1985 | Braun et al. | 399/410 |
| 4,871,158 | A | * | 10/1989 | May et al. | 270/58.11 |
| 5,920,873 | A | * | 7/1999 | Van Huben et al. | 1/1 |
| 7,612,920 | B2 | * | 11/2009 | Fujishige et al. | 358/402 |
| 7,715,061 | B2 | * | 5/2010 | van Os | 358/474 |
| 7,730,225 | B2 | * | 6/2010 | Mizuno et al. | 710/8 |
| 2004/0046977 | A1 | * | 3/2004 | Silverbrook et al. | 358/1.8 |
| 2005/0195447 | A1 | * | 9/2005 | van Os | 358/407 |
| 2006/0072144 | A1 | * | 4/2006 | Dowling et al. | 358/1.15 |
| 2006/0206519 | A1 | * | 9/2006 | Komamura et al. | 707/104.1 |
| 2008/0036757 | A1 | * | 2/2008 | Furukawa et al. | 345/418 |
| 2008/0124093 | A1 | * | 5/2008 | Kai | 399/9 |
| 2011/0032569 | A1 | * | 2/2011 | Ohashi | 358/1.15 |

FOREIGN PATENT DOCUMENTS

| | | |
|---|---|---|
| JP | 11-034423 A | 2/1999 |
| JP | 2000-122853 A | 4/2000 |
| JP | 2002-368954 A | 12/2002 |
| JP | 2006-093917 A | 4/2006 |

* cited by examiner

*Primary Examiner* — Negussie Worku
(74) *Attorney, Agent, or Firm* — Canon USA, Inc. IP Division

(57) ABSTRACT

A program startup apparatus includes an acquisition unit configured to acquire type information indicating a kind of a read document, an identification unit configured to identify a program for an image forming apparatus corresponding to the type information acquired by the acquisition unit, and a startup unit configured to start the program identified by the identification unit.

15 Claims, 7 Drawing Sheets

FIG.4

| PAGE | DOCUMENT TYPE |
|---|---|
| 1ST PAGE | EXTERNAL TRANSMISSION SHEET |
| 2ND PAGE | MERCHANDISE COST LIST |
| 3RD PAGE | MERCHANDISE ARRANGEMENT TABLE |
| 4TH PAGE | APPLICATION FORM |
| 5TH PAGE | ESTIMATE FORM |
| 6TH PAGE | PROJECT COVER |
| 7TH PAGE | PROJECT PLAN |
| 8TH PAGE | SCHEDULE |

FIG.5

| COMBINATION OF DOCUMENT TYPES | STARTUP APPLICATION |
|---|---|
| EXTERNAL TRANSMISSION SHEET<br><br>MERCHANDISE COST LIST<br><br>MERCHANDISE ARRANGEMENT TABLE | APPROVAL SYSTEM TRANSMISSION APPLICATION |
| APPLICATION FORM<br><br>ESTIMATE FORM | ORDERING SYSTEM TRANSMISSION APPLICATION |
| PROJECT COVER<br><br>PROJECT PLAN<br><br>SCHEDULE | AUTOMATIC BOOKBINDING PRINTING APPLICATION |

PROGRAM STARTUP APPARATUS, CONTROL METHOD THEREOF, AND MEDIUM STORING PROGRAM

BACKGROUND OF THE INVENTION

1. Field of the Invention

The present invention relates to a technique capable of starting a program in an image processing apparatus.

2. Description of the Related Art

Various multifunction peripherals have been proposed for providing a variety of functions. A typical multifunction peripheral generally includes an image reading unit (e.g., a scanner) and an image forming unit (e.g., a printer), and processes image information read by the image reading unit as digital information. The multifunction peripheral may also include a function of connecting to a network in addition to a basic function of copying a document so that the multifunction peripheral can have a function of performing print processing of print data received via a network and a function of transmitting image information read by an image reading unit via a network. Furthermore, the multifunction peripheral may include a function of connecting to a public telephone line to perform a facsimile communication. Thus, the multifunction peripheral includes various functions.

Further, an above-described built-in device is capable of installing and executing an application program (hereinafter, referred to as "application") to enable a user to use various functions. For example, Japanese Patent Application Laid-Open No. 2000-122853 discusses a multifunction peripheral capable of improving and upgrading its function, and adding a function by installing a program received via a network and executing processing according to the program.

SUMMARY OF THE INVENTION

According to an aspect of the present invention, an embodiment is directed to a program startup apparatus including an acquisition unit configured to acquire type information indicating a kind of a read document, a identification unit configured to identify a program for an image forming apparatus which corresponds to the type information acquired by the acquisition unit, and a startup unit configured to start the program identified by the identification unit.

According to another aspect of the present invention, an embodiment is directed to a method for controlling a program startup apparatus that starts a program for an image forming apparatus. The method includes acquiring the type information indicating a kind of a read document, identifying a program corresponding to the acquired type information, and starting the identified program.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a view illustrating an example of a document type information list.

FIG. 5 is a view illustrating an example of an application startup setting unit.

DETAILED DESCRIPTION OF THE EMBODIMENTS

Various exemplary embodiments, features, and aspects of the invention will be described in detail below with reference to the drawings. The exemplary embodiments are useful when a user uses various applications to process a document stack.

Figure 1:
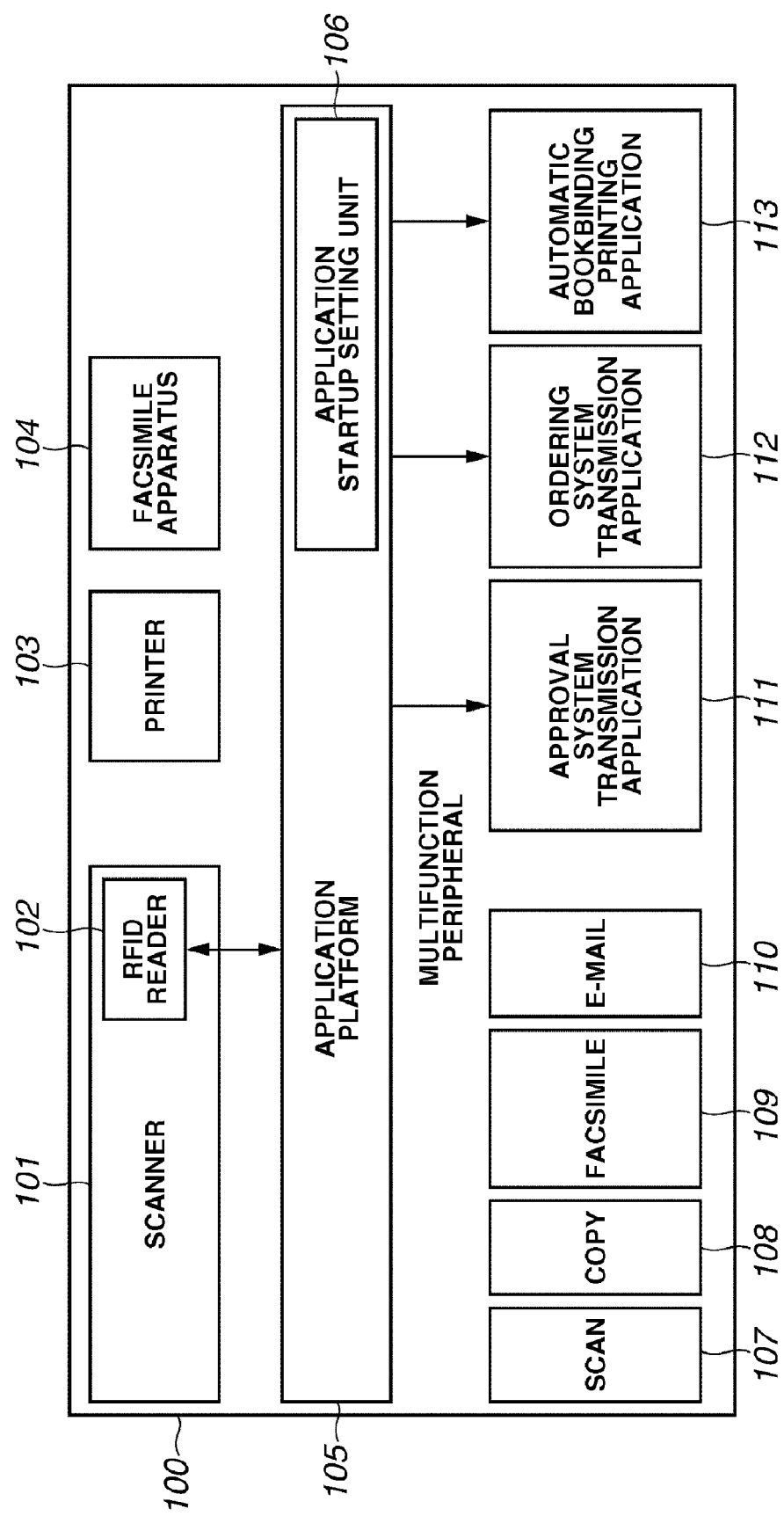
FIG. 1 is a block diagram illustrating a configuration of a multifunction peripheral that executes an application according to an exemplary embodiment of the present invention.

FIG. 1 is a block diagram illustrating a configuration of a multifunction peripheral 100 that executes an application according to an exemplary embodiment of the present invention.

A scanner 101 in FIG. 1 is an apparatus that reads document and includes, for example, a function of an automatic document feeder. An RFID reader 102 is provided inside a scanner 101 and reads document type information from a non-contact integrated circuit (IC) chip (RFID element) built into a document. In the present exemplary embodiment, a method of acquiring document type information stored in an RFID element will be described. In the context of the present specification, the terms "RFID" and "RFID element" are used interchangeably to describe an RFID tag, an RFID transponder, and other suitable non-contact integrated circuits containing RF circuitry and information to be transmitted. However, a method of storing document type information without affecting a document or a document layout and reading the stored information (e.g., a method using an electronic watermark), and a method of determining a document type from a layout of a document itself are also feasible.

A printer 103 is controlled by an application platform 105 and prints an image.

A facsimile machine 104 is controlled by the application platform 105, and transmits and receives an image using a facsimile public telephone line.

The application platform 105 is a program that controls devices included in the multifunction peripheral 100, and executes various applications including a user interface to operate these devices. Further, the application platform 105 is a program that installs an application and controls an application startup setting unit 106.

The application startup setting unit 106 is a data table that controls document type information and a startup application associating them with each other. For example, as illustrated in FIG. 5, the application startup setting unit 106 controls a combination of a document type and a startup application associating them with each other.

A scan 107, a copy 108, a facsimile 109 and an e-mail 110 are built-in programs including a user interface in the multifunction peripheral 100.

An approval system transmission application 111 transmits image data read by a scanner 101 to a workflow system of a document approval.

An ordering system transmission application 112 transmits image data read by a scanner 101 to a workflow system of an article order.

An automatic bookbinding printing application 113 prints image data read by the scanner 101, with a printer 103 using a bookbinding setting which is previously set.

In an exemplary embodiment, the approval system transmission application 111, the ordering system transmission application 112, and the automatic bookbinding printing application 113 are applications additionally installed by a user. An installable application is not limited to these applications, and a user can additionally install other applications, or an application including a quite different function.

Figure 2:
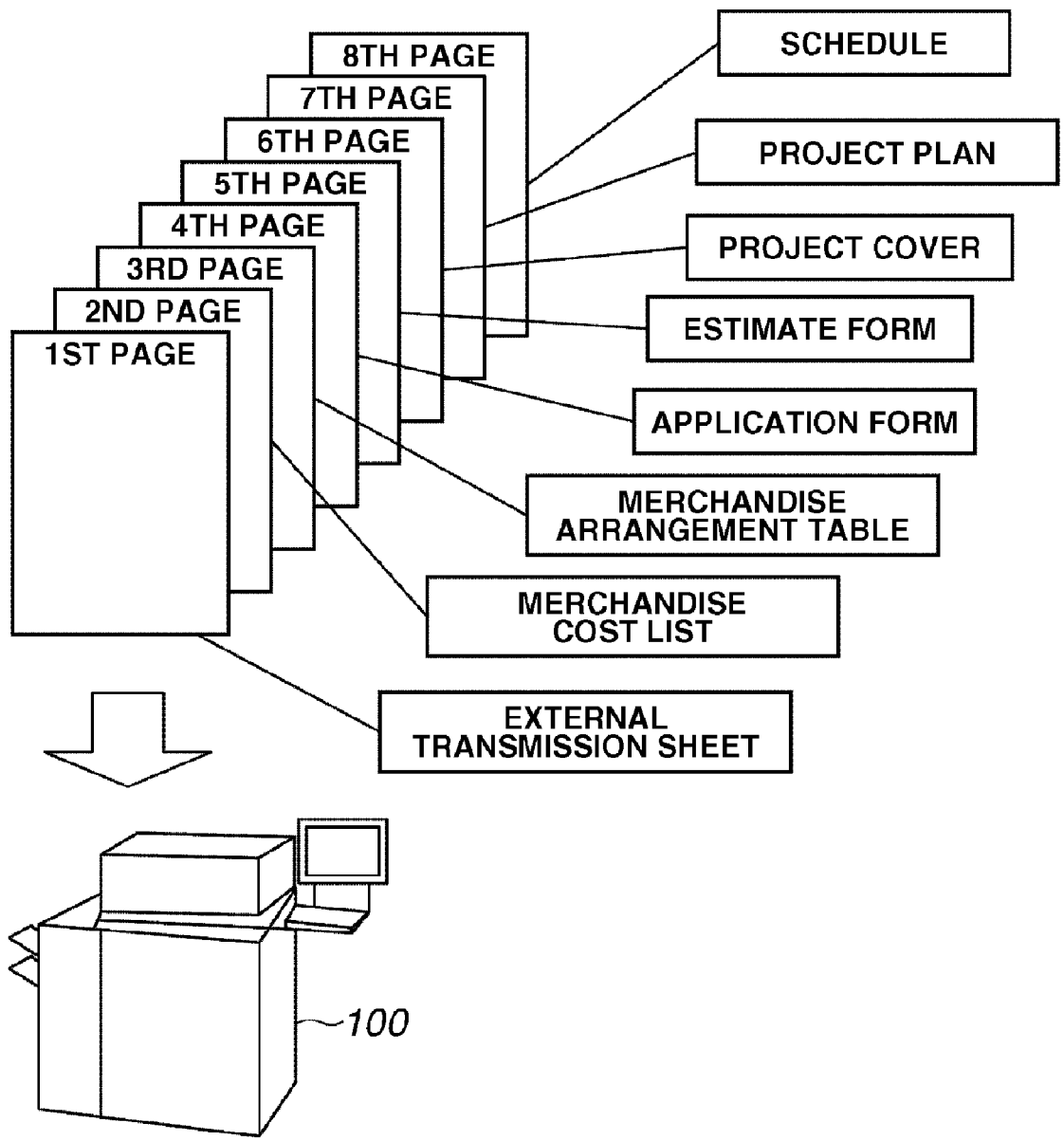
FIG. 2 is a view illustrating document type information registered in a radio frequency identifier (RFID) of a document stack placed on a multifunction peripheral.

Now, an operation of a multifunction peripheral 100 according to an exemplary embodiment will be described. When a user places a document stack including built-in RFID on a multifunction peripheral 100, the multifunction peripheral 100 reads document type information from each RFID, and automatically starts an application corresponding to a document type of the document stack. As illustrated in FIG. 2, RFID stores an external transmission sheet, a merchandise cost list, a merchandise arrangement table, an application form, an estimate form, a project cover, a project plan and a schedule, as document type information from the first page to the eighth page.

In addition, the external transmission sheet, the merchandise cost list, and the merchandise arrangement table are a combination of document type information of documents, which require a document approval, and correspond to an approval system transmission application 111. Further, the application form and the estimate form are a combination of document type information for an article order and correspond to an ordering system transmission application 112. Furthermore, the project cover, the project plan, and the schedule are a combination of document type information of documents which are to be book-bound and correspond to an automatic bookbinding printing application 113.

Figure 3:
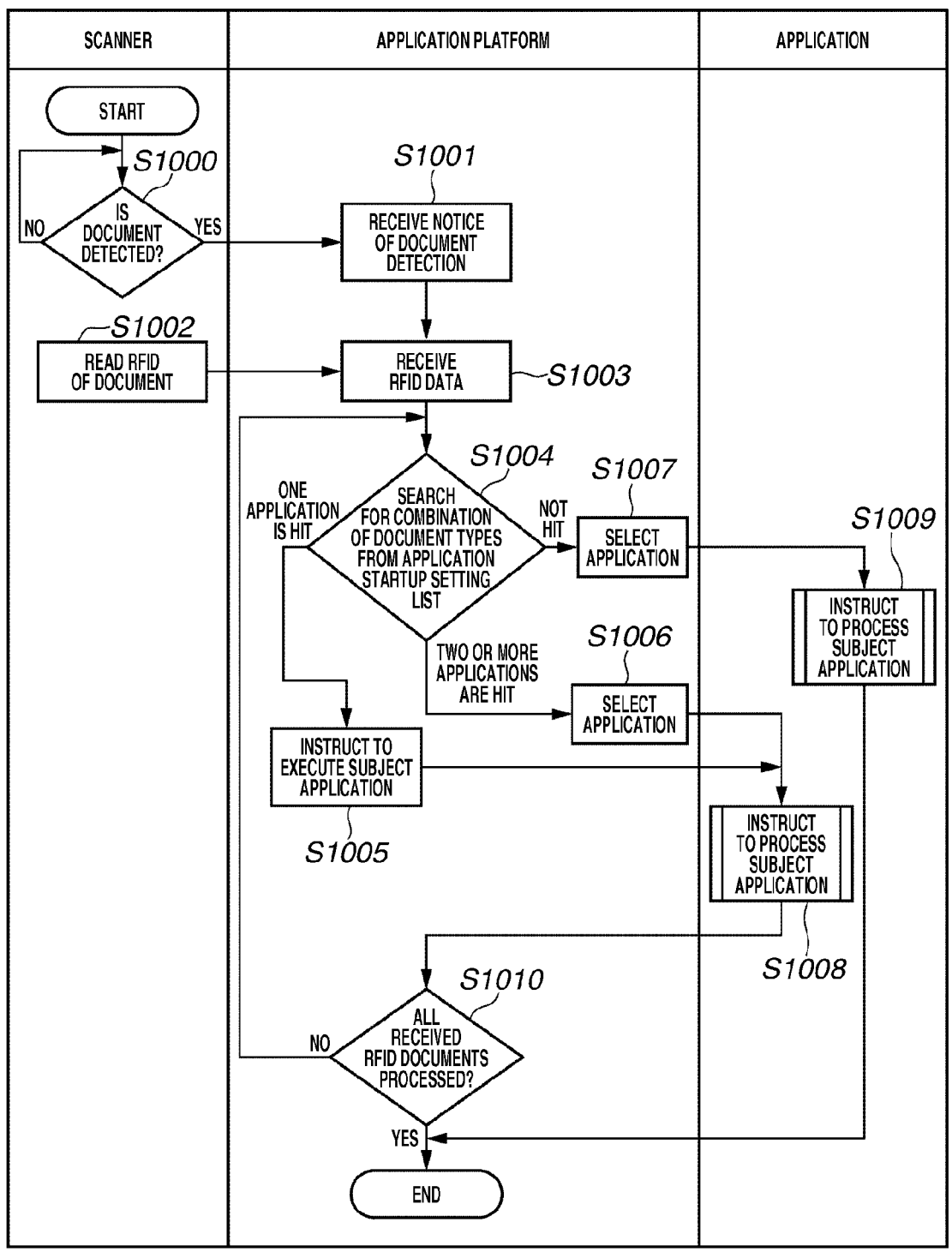
FIG. 3 is a flowchart illustrating a flow of an operation of a multifunction peripheral.

FIG. 3 is a flowchart illustrating a flow of an operation of a multifunction peripheral 100. When a document is placed on the multifunction peripheral 100, the multifunction peripheral 100 searches for an adequate applicable startup application from the application startup setting unit 106 based on a combination of document type information recorded in each RFID, and starts the application.

In step S1000, when the scanner 101 detects that a user places a document stack thereon, the scanner 101 notifies an application platform 105 that the document is detected. Each document of the document stack has built-in RFID, and the RFID holds applicable document type information indicating a kind of the document.

In step S1001, the application platform 105 receives a notification of the document detection.

In step S1002, a RFID reader 102 included in the scanner 101 reads document type information from the RFID included in the document and notifies the application platform 105 of the document type information.

In step S1003, the application platform 105 receives the document type information notified by the RFID reader 102. The RFID reader 102 notifies the document type information in order of page number, and the application platform 105 creates and stores a document type information list as illustrated in FIG. 4. The document type information is registered in the document type information list in order of page number.

In step S1004, the application platform 105 compares the created document type information list with the application startup setting unit 106 and searches for an application which is to be started. A method of searching for a startup application will be described with reference to FIG. 6.

When the application platform 105 hits only one applicable startup application in the searching, the process proceeds to step S1005. When the application platform 105 hits various applicable startup applications (i.e., two or more applicable startup applications) in the searching, the process proceeds to step S1006 in order to allow a user to select a desired application from the various applications. When there is no applicable application in the searching, the process proceeds to step S1007 in order to allow a user to select an application which is to be started.

Figure 7:
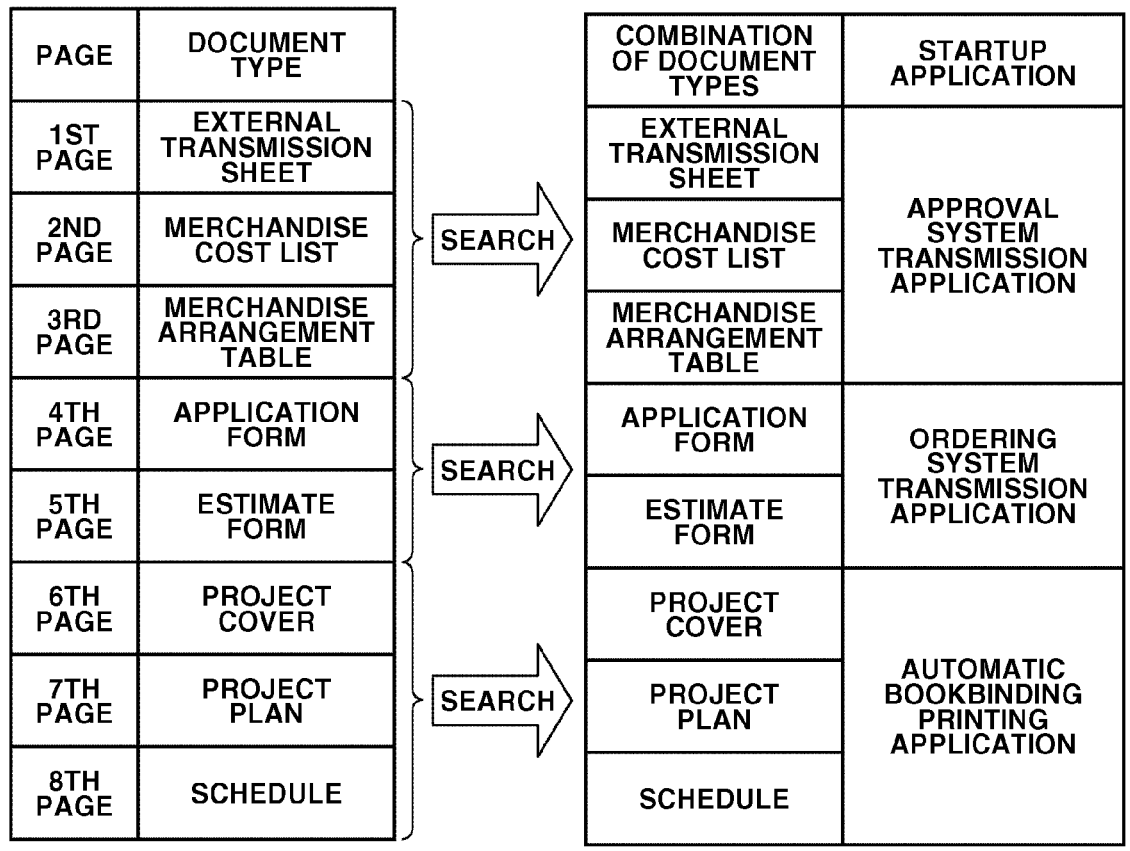
FIG. 7 is a view illustrating an example of a searching process of a startup application.

For example, when the application platform 105 compares the document type information illustrated in FIG. 4 and the application startup setting unit 106 illustrated in FIG. 5, the application platform 105 searches the approval system transmission application 111 based on a combination of the first page to the third page as illustrated in FIG. 7. Further, the application platform 105 searches the ordering system transmission application 112 based on a combination of the forth page to the fifth page. Furthermore, the application platform 105 searches the automatic bookbinding printing application 113 based on a combination of the sixth page to the eighth page.

In step S1005, the application platform 105 starts one application searched in step S1004 and the process proceeds to step S1008.

In step S1006, the application platform 105 displays an application selection screen in order to select a desired application among a plurality of applications searched in step S1004. When a user selects a desired application on the application selection screen, the application platform 105 starts the selected application and the process proceeds to step S1008.

In step S1007, since there is no application searched in step S1004, the application platform 105 displays an application selection screen on which a user can select various applications. When a user selects a desired application on the application selection screen, the application platform 105 starts the selected application and the process proceeds to step S1009.

In step S1008, the started application scans a document stack by a scanner 101 and processes the data. However, the application can scan in the step S1008 only a document which is applicable to the combination of the document type information about which the startup application setting unit 106 found the startup application in step S1004.

Figure 8:
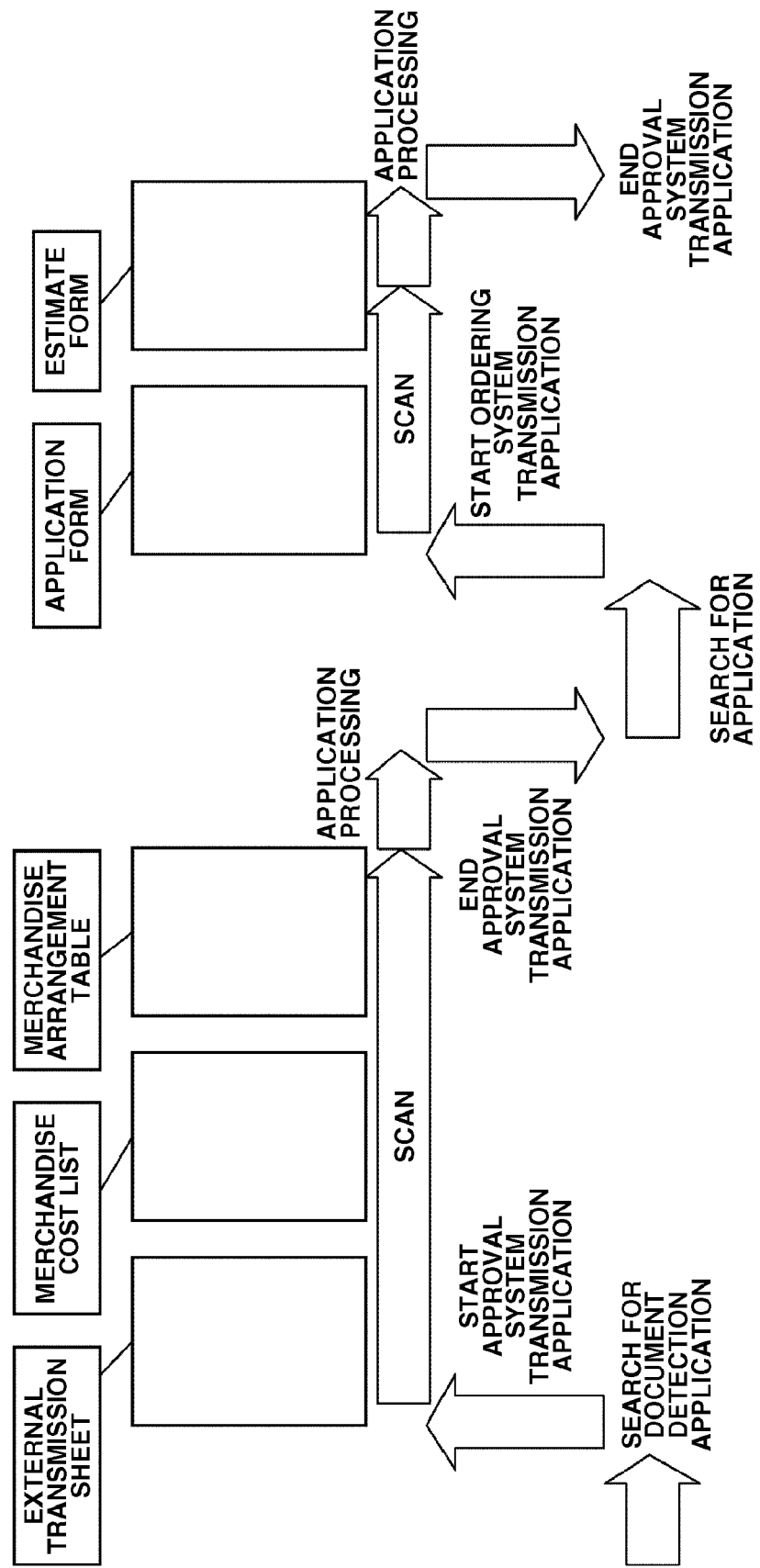
FIG. 8 is a view illustrating a scanning operation of a document.

For example, when the approval system transmission application 111 starts, the application 111 can scan the first page to the third page and cannot scan the following pages under control of the application platform 105. That is, in the present exemplary embodiment, the approval system transmission application 111 scans only documents in which the document types are an external transmission sheet, a merchandise cost list, and a merchandise arrangement table from the first page to the third page as illustrated in FIG. 8. When the processing of the approval system transmission application 111 ends, the process proceeds to step S1010.

In step S1009, an application selected and started by a user scans a document stack with the scanner 101, and processes the data. However, in this step, a startup application can scan the whole document stack placed on the scanner 101. Further, when the process of the application is completed, this flow ends.

In step S1010, the application platform 105 determines whether an application has completely processed all documents stack placed on the scanner 101 and there is no document. When there still remain documents on the scanner 101, the process returns to step S1004. When there is no document on the scanner 101, the flow ends. In the present exemplary embodiment, after the approval system transmission application 111 ends the process, there still remain documents after the forth page on the scanner 101 and the process returns to step S1004.

In the repetition step S1004, the application platform 105 searches the ordering system transmission application 112 as a startup application based on a combination from forth page to fifth page.

In the repetition step S1005, the application platform 105 starts the ordering system transmission application 112.

In the repetition step S1008, the ordering system transmission application 112 can scan from the forth page to the fifth page. That is, according to the present embodiment, the ordering system transmission application 112 scans only documents in which document types are an application form and an estimate form from the forth page to the fifth page, as illustrated in FIG. 8. When the processing of the ordering system transmission application 112 ends, the process proceeds to step S1010.

In the repeated step S1010, after the processing of the ordering system transmission application 112 ends, there still remain documents after the fifth page on the scanner 101. Thus, the processing returns to step S1004.

In the repetition step S1004, the application platform 105 searches an automatic bookbinding printing application 113 as a startup application based on a combination from the sixth page to the eighth page.

Further, in the repetition step S1005, the application platform 105 starts the automatic bookbinding printing application 113.

In the repetition step S1008, the automatic bookbinding printing application 113 can scan from the sixth page to the eighth page. When the processing of the automatic bookbinding printing application 113 ends, the process proceeds to step S1010.

In the repetition step S1010, after the processing of the automatic bookbinding printing application 113 ends, all the documents on the scanner have been processed, and thus the flow ends.

Then, the processing for searching a startup application according to the present embodiment will be described in detail below with reference to FIG. 6.

Figure 6:
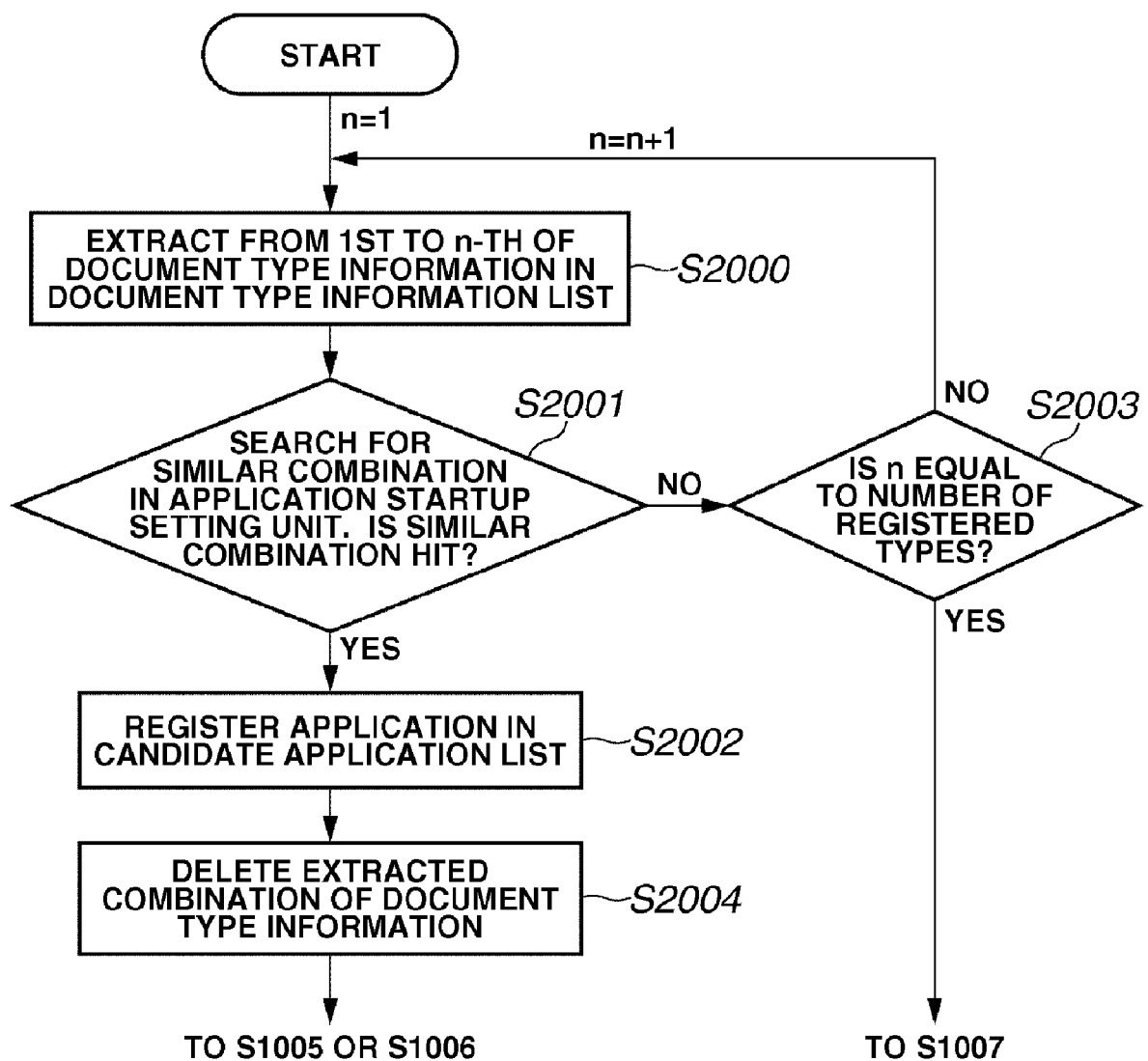
FIG. 6 is a flowchart illustrating a flow of a searching process of a startup application.

FIG. 6 is a flowchart illustrating the flow of searching process of the startup application. This flow illustrates details of the processing in step S1004 in FIG. 3. The document type information list illustrated in FIG. 4 and the application startup setting unit 106 illustrated in FIG. 5 will be described below again as an example.

In step S2000, an application platform 105 extracts document type information registered in the top (the first) to the n-th in a document type information list illustrated in FIG. 4. Since a variable n is substituted by 1 at first, the application platform 105 extracts document type information registered at the top of the document type information list in FIG. 4, that is, extracts only an external transmission sheet.

In step S2001, the application platform 105 searches for a combination of document type information that matches a combination of the document type information extracted in step S2000, from an application startup setting unit 106. When the application platform 105 has found a matching combination from the application startup setting unit 106 (YES in step S2001), the process proceeds to step S2002. When the application platform 105 has not found the matching combination (NO in step S2001), the process proceeds to step S2003. In addition, in this searching processing, when the document type information list and the application startup setting unit 106 are compared, the application platform 105 determines that they match even if the order of the combination of document type information is different.

In step S2002, the application platform 105 registers a startup application that corresponds to the combination of the document type information searched in step S2001, in a startup candidate application list.

In step S2004, the application platform 105 deletes the combination of the document type information, about which the startup application is found from the application startup setting unit 106, from the document type information list in FIG. 4. Accordingly, when the application platform 105 finds a startup application, the application platform 105 deletes a combination of document type information about which the startup application is found. Therefore, when the flow is executed again (S1004), the application platform 105 searches for a startup application corresponding to a next combination of document type information in the document type information list in FIG. 4, through steps S2000 and S2001.

In addition, in step S2002, when the application platform 105 registers one startup application in the startup candidate application list, the process proceeds from step S1004 to step S1005. On the other hand, when the application platform 105 registers two or more startup applications in the startup candidate application list, the process proceeds from step S1004 to step S1006. When the application platform 105 displays an application selection screen in step S1006, the application platform 105 uses the registered content of the startup candidate application list in step S2002.

In step S2003, the application platform 105 determines whether a variable n matches a registered number of the document type information list in FIG. 4t. When the variable n matches the registered number (YES in step S2003), the application platform 105 has not found a startup application, so that the process proceeds to step S1007.

On the other hand, when the variable n does not yet match the registered number of the document type information list in FIG. 4 (NO in step S2003), the application platform 105 increments n by 1, and the process returns to step S2000.

As described above, according to the present exemplary embodiment, a user does not need to start up a necessary application each time based on his/her decision. When the user collectively prepares related documents, an application for processing the documents automatically starts. Thus, a complicated operation is not necessary.

Further, when the user cannot collect related documents, the application for processing the documents does not start without the user's operation. Therefore, the processing is prevented from proceeding when documents are imperfect or lacking.

Further, an application that processes a combination of a document scans only a target document according to the combination. Therefore, even when a document stack in which two or more kinds of processing are mixed, is collectively set on a scanner, applicable applications can be started in order and properly process the set document stack.

Further, the present invention can be realized by supplying to a system or an apparatus a storage medium, in which a program code of software for realizing the functions of the above-described embodiments is stored. The system or the apparatus can read and execute the supplied program codes to realize the functions of the present embodiments.

In this case, the program code itself read from the storage medium realizes the functions of the above-described embodiment, and the program code and the storage medium storing the program code constitute the present invention.

A recording medium supplying the program can be selected from, for example, a floppy disk, a hard disk, an optical disk, a magneto-optical disc, a compact disc read only memory (CD-ROM), a compact disc recordable (CD-R), a magnetic tape, a non-volatile memory card, or a read only memory (ROM).

Further, in the present invention, an operating system (OS) working on a computer can perform apart or the whole of actual processing based on an instruction of a program code read by a computer, and realize the functions of the above-described embodiments by the processing.

Furthermore, in the present invention, after a program code read from a storage medium is written in a memory included in a function expansion unit connected with a computer, a central processing unit (CPU) can perform actual processing based on an instruction of the program code and realize the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-257890 filed Sep. 22, 2006, which is hereby incorporated by reference herein in its entirety.

What is claimed is:

1. A program startup apparatus, comprising:
    a scanner unit configured to read a plurality of documents and generate document data consisting of a plurality of pages;
    an acquisition unit configured to acquire document type information about each page included in the documents based on the plurality of documents read by the scanner unit;
    an identification unit configured to, in a case where the acquisition unit acquires three kinds of document type information of an external transmission sheet, a merchandise cost list, and a merchandise arrangement table, identify an approval system transmission application corresponding to a combination of these three kinds of document type information, in a case where the acquisition unit acquires two kinds of document type information of an application form and an estimate form, identify an ordering system transmission application corresponding to a combination of these two kinds of document type information, and in a case where the acquisition unit acquires three kinds of document type information of a project cover, a project plan, and a schedule, identify an automatic bookbinding printing application corresponding to a combination of these three kinds of document type information;
    a startup unit configured to start an application identified by the identification unit;
    a transmission unit configured to, in a case where the application started by the startup unit is the approval system transmission application, transmit the document data to a workflow system of document approval according to the approval system transmission application, and in a case where the application started by the startup unit is the ordering system transmission application, transmit the document data to a workflow system of an article order according to the ordering system transmission application; and
    a printing unit configured to, in a case where the application started by the startup unit is the automatic bookbinding printing application, print the document data according to the automatic bookbinding printing application.

2. The program startup apparatus according to claim 1, wherein when the identification unit identifies only one application corresponding to the document type information acquired by the acquisition unit, the startup unit starts the identified application.

3. The program startup apparatus according to claim 2, further comprising:
    a display unit configured to, in a case where there is a plurality of startup candidate applications that corresponds to a combination of the document type information acquired by the acquisition unit, register the plurality of startup candidate applications in an application list, and display an application selection screen based on the application list in which the startup candidate applications are registered,
    wherein the startup unit starts one application selected via the application selection screen displayed by the display unit.

4. The program startup apparatus according to claim 3, wherein the display unit displays an application selection screen on which a user is capable of selecting an application in the program startup apparatus, in a case where there is no startup candidate application that corresponds to the combination of document type information acquired by the acquisition unit.

5. The program startup apparatus according to claim 1, wherein the acquisition unit comprises a radio frequency identifier (RFIM) reader to read data from a non-contact RFID element included in a document.

6. A method of controlling a program startup apparatus that starts an application for an image forming apparatus, the method comprising:
    reading a plurality of documents and generate document data consisting of a plurality of pages;
    acquiring document type information about each page included in the documents based on the read plurality of documents;
    identifying, using a central processing unit, in a case where acquiring document type information includes acquiring three kinds of document type information of an external transmission sheet, a merchandise cost list, and a merchandise arrangement table, an approval system transmission application corresponding to a combination of these three kinds of document type information, in a case where acquiring document type information includes acquiring two kinds of document type information of an application form and an estimate form, an ordering system transmission application corresponding to a combination of these two kinds of document type information, and in a case where acquiring document type information includes acquiring three kinds of document type information of a project cover, a project plan, and a schedule, identify an automatic bookbinding printing application corresponding to a combination of these three kinds of document type information;
    starting identified an application;
    transmitting, in a case where the started application is the approval system transmission application, the document data to a workflow system of document approval according to the approval system transmission application, and in a case where the started application is the ordering system transmission application, the document data to a workflow system of an article order according to the ordering system transmission application; and printing, in a case where the started application is the automatic bookbinding printing application, the document data according to the automatic bookbinding printing application.

7. The method according to claim 6, wherein starting includes automatically starting the identified application when only one application corresponding to the acquired document type information is identified.

8. The method according to claim 7, further comprising:
registering, in a case where there is a plurality of startup candidate applications that corresponds to a combination of the acquired document type information, the plurality of startup candidate applications in an application list, and displaying an application selection screen based on the application list in which the startup candidate applications are registered,
wherein starting includes starting one application selected via the displayed application selection screen.

9. The method according to claim 8, wherein displaying includes displaying an application selection screen on which a user is capable of selecting an application in the program startup apparatus, in a case where there is no startup candidate application that corresponds to the combination of acquired document type information.

10. The method according to claim 6, wherein acquiring further includes reading data from a non-contact radio frequency identifier (RFID) element included in a document.

11. A method of controlling a program startup apparatus, the method comprising:
reading a plurality of documents and generate document data consisting of a plurality of pages;
acquiring document type information about each page included in the documents based on the read plurality of documents;
identifying, using a central processing unit, in a case where acquiring document type information includes acquiring three kinds of document type information of an external transmission sheet, a merchandise cost list, and a merchandise arrangement table, an approval system transmission application corresponding to a combination of these three kinds of document type information, in a case where acquiring document type information includes acquiring two kinds of document type information of an application form and an estimate form, an ordering system transmission application corresponding to a combination of these two kinds of document type information, and in a case where acquiring document type information includes acquiring three kinds of document type information of a project cover, a project plan, and a schedule, identify an automatic bookbinding printing application corresponding to a combination of these three kinds of document type information;
starting an identified an application;
transmitting, in a case where the started application is the approval system transmission application, the document data to a workflow system of document approval according to the approval system transmission application, and in a case where the started application is the ordering system transmission application, the document data to a workflow system of an article order according to the ordering system transmission application; and
printing, in a case where the started application is the automatic bookbinding printing application, the document data according to the automatic bookbinding printing application.

12. A non-transient computer-readable storage medium storing instructions which, when executed by a program startup apparatus, causes the program startup apparatus to execute a method according to claim 11.

13. A program startup apparatus, comprising:
a scanner unit configured to read a plurality of documents and generate document data consisting of a plurality of pages;
an acquisition unit configured to acquire document type information about each page included in the documents based on the plurality of documents read by the scanner unit;
an identification unit configured to, in a case where the acquisition unit acquires three kinds of document type information of an external transmission sheet, a merchandise cost list, and a merchandise arrangement table, identify an approval system transmission application corresponding to a combination of these three kinds of document type information, and in a case where the acquisition unit acquires two kinds of document type information of an application form and an estimate form, identify an ordering system transmission application corresponding to a combination of these two kinds of document type information;
a startup unit configured to start an application identified by the identification unit;
a transmission unit configured to, in a case where the application started by the startup unit is the approval system transmission application, transmit the document data to a workflow system of document approval according to the approval system transmission application, and in a case where the application started by the startup unit is the ordering system transmission application, transmit the document data to a workflow system of an article order according to the ordering system transmission application.

14. The program startup apparatus according to claim 13, wherein in a case where the startup unit starts the approval system transmission application, the scanner unit reads a first page to a second page of a document corresponding to the approval system transmission application, generates document data consisting of a plurality of pages, and responds to a restriction function by not reading pages except for the first page and second page in the document.

15. The program startup apparatus according to claim 14, wherein the identification unit identifies an application to start again based on pages following the second page after the transmission unit transmits document data of the first page to the second page.

* * * * *